United States Patent
Maeda et al.

(10) Patent No.: US 10,626,270 B2
(45) Date of Patent: Apr. 21, 2020

(54) POLYESTER ELASTOMER RESIN COMPOSITION FOR BLOW MOLDING

(71) Applicant: TOYOBO CO., LTD., Osaka (JP)

(72) Inventors: Yuki Maeda, Shiga (JP); Takuya Akaishi, Shiga (JP)

(73) Assignee: TOYOBO CO., LTD., Osaka (JP)

( * ) Notice: Subject to any disclaimer, the term of this patent is extended or adjusted under 35 U.S.C. 154(b) by 85 days.

(21) Appl. No.: 16/080,542

(22) PCT Filed: Mar. 2, 2017

(86) PCT No.: PCT/JP2017/008282
§ 371 (c)(1),
(2) Date: Aug. 28, 2018

(87) PCT Pub. No.: WO2017/150668
PCT Pub. Date: Sep. 8, 2017

(65) Prior Publication Data
US 2019/0092940 A1    Mar. 28, 2019

(30) Foreign Application Priority Data
Mar. 4, 2016 (JP) ................................. 2016-041931

(51) Int. Cl.
| | | |
|---|---|---|
| C08L 67/02 | (2006.01) | |
| C08L 63/00 | (2006.01) | |
| C08L 77/06 | (2006.01) | |
| C08K 5/098 | (2006.01) | |
| B29C 49/00 | (2006.01) | |
| B29K 67/00 | (2006.01) | |
| C08K 5/17 | (2006.01) | |

(52) U.S. Cl.
CPC .......... *C08L 67/02* (2013.01); *B29C 49/0005* (2013.01); *C08K 5/098* (2013.01); *C08L 63/00* (2013.01); *C08L 67/025* (2013.01); *C08L 77/06* (2013.01); *B29C 2049/001* (2013.01); *B29K 2067/00* (2013.01); *C08K 5/17* (2013.01); *C08L 2205/24* (2013.01); *C08L 2207/04* (2013.01)

(58) Field of Classification Search
CPC .......... B29C 49/0005; B29C 2049/001; B29K 2067/00; C08K 5/098; C08K 5/17; C08L 63/00; C08L 67/02; C08L 67/025; C08L 77/06; C08L 2205/24; C08L 2207/04
See application file for complete search history.

(56) References Cited

U.S. PATENT DOCUMENTS

| | | |
|---|---|---|
| 5,733,986 A | 3/1998 | Senda et al. |
| 2011/0230602 A1 | 9/2011 | Nagai et al. |

FOREIGN PATENT DOCUMENTS

| | | |
|---|---|---|
| JP | 57-36124 | 2/1982 |
| JP | 8-151508 | 6/1996 |
| JP | 2782773 | 8/1998 |
| JP | 11-153226 | 6/1999 |
| JP | 11-323109 | 11/1999 |
| JP | 2001-2768 | 1/2001 |
| JP | 2001-234042 | 8/2001 |
| JP | 2001-247752 | 9/2001 |
| JP | 2001247752 A * | 9/2001 |
| JP | 3714747 | 11/2005 |
| JP | 2010-84140 | 4/2010 |
| JP | 2011-207926 | 10/2011 |
| JP | 2013-189550 | 9/2013 |

OTHER PUBLICATIONS

JP2001247752 English Machine Translation, Jan. 4, 2020. (Year: 2020).*
International Search Report dated May 23, 2017 in International (PCT) Application No. PCT/JP2017/008282.

\* cited by examiner

*Primary Examiner* — Christopher M Rodd
(74) *Attorney, Agent, or Firm* — Wenderoth, Lind & Ponack, L.L.P.

(57) ABSTRACT

The present invention relates to a polyester elastomer resin composition containing: (A) a thermoplastic polyester elastomer; (B) a di- or higher functional epoxy compound; (C) an organic carboxylic acid alkali metal salt having 3 to 40 carbon atoms; (D) an inorganic crystal nucleating agent; and (E) a urea compound scavenger having an amine value of 50 eq/t or more, wherein per 100 parts by mass of component (A), component (B) is present in an amount of 0.1 to 5 parts by mass, component (D) is present in an amount of 0 to 3 parts by mass, and component (E) is present in an amount of 0.1 to 5 parts by mass; component (C), on an alkali metal basis, is present in an amount of 50 to 2000 ppm in the polyester elastomer resin composition on a mass basis.

7 Claims, No Drawings

POLYESTER ELASTOMER RESIN COMPOSITION FOR BLOW MOLDING

TECHNICAL FIELD

The present invention relates to polyester elastomer resin compositions for blow molding. More specifically, the invention relates to polyester elastomer resin compositions for blow molding that are excellent not only in blow moldability but also in shape stability of the resulting molded articles.

BACKGROUND ART

Thermoplastic polyester elastomers exhibit excellent injection or extrusion moldability and high mechanical strength, and have applications in automobile parts, electric and electronic components, fibers, films, etc., as materials having excellent rubber properties (e.g., elastic recovery, impact resistance, and flexibility) and excellent cold resistance.

Thermoplastic polyester elastomers were considered unsuitable for blow molding due to their low melt viscosity. However, viscosity-increasing methods using a polyepoxy compound, a polyisocyanate compound, or an ionomer resin have become available. Taking advantage of the features, thermoplastic polyester elastomers have also been used in blow-molded products, such as flexible boots, for dust protection or grease retention of flexible drive couplings, such as constant-velocity joints of automobiles (e.g., PTL 1 to 3).

Due to demands, such as for light weight and a streamlined assembly of blow molded products, blow molding has also been required to address intricate shapes having both a thin portion and a thick portion. Typically, a relatively slow solidification rate of molten resin is advantageous in simplifying blow molding. However, a slow solidification rate in the thick portion is likely to cause defamation, such as sink marks. Thus, there has also been a demand for achieving the prevention of deformation of thick portions, such as sink marks, as well as excellent blow moldability.

The properties required for functional parts, such as flexible boots, include flexing fatigue resistance, heat aging resistance, oil resistance, and grease resistance. The requirements for the levels of such properties have been rising every year. In particular, grease resistance in a more severe environment, such as at a temperature exceeding 140° C., needs further improvement.

CITATION LIST

Patent Literature

PTL 1: U.S. Pat. No. 3,714,747
PTL 2: U.S. Pat. No. 2,782,773
PTL 3: JP2001-234042A

SUMMARY OF INVENTION

Technical Problem

An object of the present invention is to provide a thermoplastic polyester elastomer composition that is excellent in blow moldability, that can reduce the development of sink marks in thick portions of molded articles, and that is further excellent in heat aging resistance when grease is adhered to the molded articles.

Solution to Problem

The present inventors found that the urea compound contained in grease acts on thermoplastic polyester elastomers, thereby markedly decreasing the tensile elongation of the elastomers at a temperature exceeding 140° C. The inventors also found that a small amount of a combination of a specific organic carboxylic acid alkali metal salt, an epoxy compound, and a urea compound scavenger contributes to improving moldability and increasing the melt viscosity, and completed the invention.

Specifically, the present invention is as described below.

[1]

A polyester elastomer resin composition for blow molding comprising:
 a thermoplastic polyester elastomer (A);
 a di- or higher functional epoxy compound (B);
 an organic carboxylic acid alkali metal salt having 3 to 40 carbon atoms (C);
 an inorganic crystal nucleating agent (D); and
 a urea compound scavenger having an amine value of 50 eq/t or more (E), wherein
 the thermoplastic polyester elastomer (A) is composed of a hard segment and a soft segment that are linked to each other,
  the hard segment being composed of a polyester formed from an aromatic dicarboxylic acid and an aliphatic and/or alicyclic glycol,
  the soft segment being at least one member selected from aliphatic polyethers, aliphatic polyesters, or aliphatic polycarbonates,
 per 100 parts by mass of component (A), component (B) is present in an amount of 0.1 to 5 parts by mass, component (D) is present in an amount of 0 to 3 parts by mass, and component (E) is present in an amount of 0.1 to 5 parts by mass,
  component (C), on an alkali metal basis, is present in an amount of 50 to 2000 ppm in the polyester elastomer resin composition on a mass basis,
 the polyester elastomer resin composition has a cooling crystallization temperature (TC2) lower than the melting point (Tm) of the polyester elastomer resin composition by 20 to 40° C., and
 the polyester elastomer resin composition has a melt flow rate of 0.5 to 3.0 g/10 min under a load of 2.16 kg (as measured in accordance with JIS K7210-1:2014 A at a temperature of 230° C.)

[2]

The polyester elastomer resin composition for blow molding according to [1], wherein the urea compound scavenger (E) is an amino group-containing compound having an amine value of 50 to 2000 eq/t.

[3]

The polyester elastomer resin composition for blow molding according to [1] or [2], wherein
 the thermoplastic polyester elastomer (A) is a copolymer formed from terephthalic acid, 1,4-butanediol, and polyoxytetramethylene glycol,
 the polyoxytetramethylene glycol has a number average molecular weight of 500 to 4000,
 the amount of the polyoxytetramethylene glycol copolymerized is 5 to 20 mol % of the entire glycol component that partly forms the thermoplastic polyester elastomer (A).

[4]

The polyester elastomer resin composition for blow molding according to any one of [1] to [3], wherein the epoxy compound (B) has a weight average molecular weight (Mw) of 100 or more, and an epoxy value of 1.0 meq/g or more.

[5]

The polyester elastomer resin composition for blow molding according to any one of [1] to [4], wherein the organic carboxylic acid of the organic carboxylic acid alkali metal salt having 3 to 40 carbon atoms (C) is an aliphatic carboxylic acid having 3 to 20 carbon atoms.

[6]

The polyester elastomer resin composition for blow molding according to any one of [1] to [5], wherein the inorganic crystal nucleating agent (D) is talc.

[7]

The polyester elastomer resin composition for blow molding according to any one of [1] to [6], wherein after the polyester elastomer resin composition is subjected to heat treatment at 140° C. for 300 hours with a urea compound-containing grease being applied to the composition, the polyester elastomer resin composition has a tensile elongation of 200% or more.

Advantageous Effects of Invention

Because the polyester elastomer resin composition of the present invention can slow the decline in the crystallization rate despite its high melt viscosity, the composition not only exhibits excellent molding processability during blow molding, but also reduces the sink marks in thick portions. Thus, the polyester elastomer resin composition of the present invention is excellent not only in blow moldability, but also in shape stability of the obtained molded article.

DESCRIPTION OF EMBODIMENTS

Thermoplastic Polyester Elastomer (A)

The thermoplastic polyester elastomer (A) for use in the present invention is a thermoplastic polyester elastomer in which a hard segment composed of a polyester formed from an aromatic dicarboxylic acid and an aliphatic and/or alicyclic glycol is linked with at least one soft segment selected from aliphatic polyethers, aliphatic polyesters, or aliphatic polycarbonates.

In the thermoplastic polyester elastomer (A) for use in the present invention, the aromatic dicarboxylic acid that partly forms the polyester of the hard segment may be a widely used typical aromatic dicarboxylic acid, and the aromatic dicarboxylic acid is not particularly limited. The main aromatic dicarboxylic acid is preferably terephthalic acid or naphthalene dicarboxylic acid. Among isomers of naphthalene dicarboxylic acid, 2,6-naphthalene dicarboxylic acid is preferable. Other acid components include aromatic dicarboxylic acids, such as diphenyldicarboxylic acid, isophthalic acid, and sodium 5-sulfoisophthalic acid; alicyclic dicarboxylic acids, such as cyclohexane dicarboxylic acid, and tetrahydrophthalic anhydride; and aliphatic dicarboxylic acids, such as succinic acid, glutaric acid, adipic acid, azelaic acid, sebacic acid, dodecanedioic acid, dimer acid, and hydrogenated dimer acid. These dicarboxylic acids can be used to such an extent that the dicarboxylic acids do not substantially decrease the melting point of the thermoplastic polyester elastomer, and the amount is preferably less than 30 mol %, and more preferably less than 20 mol %, of the total acid components.

The aliphatic or alicyclic glycol that partly forms the polyester of the hard segment in the thermoplastic polyester elastomer (A) for use in the present invention may be a widely used typical aliphatic or alicyclic glycol, and the aliphatic or alicyclic glycol is not particularly limited. The main aliphatic or alicyclic glycol is preferably $C_{2-8}$ alkylene glycols. Specifically, the aliphatic or alicyclic glycol includes ethylene glycol, 1,3-propylene glycol, 1,4-butanediol, 1,6-hexanediol, and 1,4-cyclohexane dimethanol. Of these, either ethylene glycol or 1,4-butanediol is preferable from the standpoint of imparting heat resistance to the elastomer composition.

The component that constitutes the polyester of the hard segment is preferably composed of a butylene terephthalate unit (a unit formed from terephthalic acid and 1,4-butanediol) or a butylene naphthalate unit (a unit formed from 2,6-naphthalene dicarboxylic acid and 1,4-butanediol) from the standpoint of physical properties, moldability, and cost performance.

When an aromatic polyester suitable for the polyester that constitutes the hard segment of the thermoplastic polyester elastomer (A) for use in the present invention is produced beforehand and copolymerized with the soft segment component, such an aromatic polyester can be easily prepared in accordance with a typical polyester production method. The polyester preferably has a number average molecular weight of 10000 to 40000.

The soft segment of the thermoplastic polyester elastomer (A) for use in the present invention is at least one member selected from aliphatic polyethers, aliphatic polyesters, or aliphatic polycarbonates. The aliphatic polyethers include polyoxyethylene glycol, polyoxypropylene glycol, polyoxytetramethylene glycol, polyoxyhexamethylene glycol, polyoxytrimethylene glycol, copolymers of ethylene oxide with propylene oxide, ethylene oxide adducts of polyoxyethylene glycol, and copolymers of ethylene oxide with tetrahydrofuran. The aliphatic polyesters include poly(ε-caprolactone), polyenantholactone, polycaprylolactone, and polybutylene adipate.

The main aliphatic polycarbonates are preferably those formed from $C_{2-12}$ aliphatic diol residues. Examples of these aliphatic diols include ethylene glycol, 1,3-propylene glycol, 1,4-butanediol, 1,5-pentanediol, 1,6-hexanediol, 1,8-octanediol, 2,2-dimethyl-1,3-propanediol, 3-methyl-1,5-pentanediol, 2,4-diethyl-1,5-pentanediol, 1,9-nonanediol, and 2-methyl-1,8-octanediol. In particular, $C_{5-12}$ aliphatic diols are preferable from the standpoint of flexibility and low-temperature properties of the obtained thermoplastic polyester elastomer (A). These components may be used singly or in a combination of two or more where necessary, with reference to the descriptions below.

Aliphatic polycarbonate diols having excellent low-temperature properties for forming a usable soft segment of the thermoplastic polyester elastomer of the present invention are preferably those having a low melting point (e.g., 70° C. or lower) and a low glass-transition temperature. An aliphatic polycarbonate diol formed from 1,6-hexanediol, which is typically used for forming the soft segment of a thermoplastic polyester elastomer, has a glass-transition temperature of as low as about −60° C., and a melting point of about 50° C., thus exhibiting excellent low-temperature properties. In addition, an aliphatic polycarbonate diol obtained by copolymerizing the aliphatic polycarbonate diol with a suitable amount of, for example, 3-methyl-1,5-pentanediol is considered to have excellent low-temperature properties due to its decreased melting point or amorphous structure, although the glass-transition point is slightly increased compared with that of the original aliphatic polycarbonate diol. Additionally, an aliphatic polycarbonate diol formed from 1,9-nonanediol and 2-methyl-1,8-octanediol, for example, is considered to have excellent low-temperature properties because of its sufficiently low melting point of about 30° C. and glass-transition temperature of about −70° C.

The thermoplastic polyester elastomer (A) for use in the present invention is preferably a copolymer mainly formed from terephthalic acid, 1,4-butanediol, and polyoxytetramethylene glycol from the standpoint of economic performance, heat resistance, and cold resistance. Terephthalic acid is preferably present in an amount of 40 mol % or more, more preferably 70 mol % or more, still more preferably 80 mol % or more, and particularly preferably 90 mol % or more in the dicarboxylic acid components that partly form the thermoplastic polyester elastomer (A). 1,4-butanediol and polyoxytetramethylene glycol are preferably present in a total amount of 40 mol % or more, more preferably 70 mol % or more, still more preferably 80 mol % or more, and particularly preferably 90 mol % or more in the glycol components that partly foam the thermoplastic polyester elastomer (A).

The polyoxytetramethylene glycol preferably has a number average molecular weight of 500 to 4000. A number average molecular weight of less than 500 may make it unlikely to develop the elastic properties. However, a number average molecular weight of more than 4000 may lead to decreased miscibility with the polyester part that constitutes the hard segment of the thermoplastic polyester elastomer (A), resulting in difficulty in forming a block copolymer. The polyoxytetramethylene glycol more preferably has a number average molecular weight of 800 or more and 3000 or less, and still more preferably 1000 or more and 2500 or less; taking into consideration the balance between blow moldability, molding stability, and reduction of sink marks in thick portions, the polyoxytetramethylene glycol particularly preferably has a number average molecular weight of 1500 or more and 2500 or less.

The amount of the polyoxytetramethylene glycol copolymerized is preferably 5 to 20 mol % of the entire glycol components that partly form the thermoplastic polyester elastomer (A). The polyoxytetramethylene glycol is more preferably 7 mol % or more and 18 mol % or less, and still more preferably 8 mol % or more and 15 mol % or less of the entire glycol components.

In the thermoplastic polyester elastomer for use in the present invention, the ratio (parts by mass) of the crystalline polyester that constitutes the hard segment to the at least one member selected from aliphatic polyethers, aliphatic polyesters, or aliphatic polycarbonates that constitutes the soft segment (the hard segment:the soft segment) is preferably 30:70 to 95:5, more preferably 40:60 to 90:10, and still more preferably 45:55 to 87:13.

The thermoplastic polyester elastomer (A) for use in the present invention is preferably a crystalline polyester having a melting point of 150° C. or higher and 230° C. or lower so that the elastomer can be distributed at room temperature. The thermoplastic polyester elastomer (A) more preferably has a melting point of 180 to 220° C. A melting point lower than 150° C. may make it difficult for the elastomer composition to satisfy the heat resistance properties for automobiles and home electric appliances, while a melting point higher than 230° C. may result in a failure to achieve a high crystalline nature and sufficient flexing fatigue resistance of the polyester elastomer.

The thermoplastic polyester elastomer (A) for use in the present invention preferably has a reduced viscosity of 0.5 dl/g or more and 3.5 dl/g or less, as measured by the measurement method described later. A reduced viscosity of less than 0.5 dl/g may lead to a low durability of the resin, while a reduced viscosity of more than 3.5 dl/g may result in insufficient processability, such as in injection molding. The thermoplastic polyester elastomer (A) more preferably has a reduced viscosity of 1.0 dl/g or more and 3.0 dl/g or less, and still more preferably 1.5 dl/g or more and 2.8 dl/g or less. The acid value is preferably 200 eq/t or less. Because the epoxy compound (B), described later, is contained in the resin composition, the acid value is particularly preferably 50 eq/t or less to avoid gelatinization that may occur when mixing these components.

The thermoplastic polyester elastomer (A) for use in the present invention is produced by a known method. For example, any of the following methods may be used: a method in which a diester formed from a dicarboxylic acid and a lower alcohol, an excessive amount of a low-molecular-weight glycol, and a soft segment component are subjected to transesterification in the presence of a catalyst, and the obtained reaction product is subjected to polycondensation; a method in which a dicarboxylic acid, an excessive amount of a glycol, and a soft segment component are subjected to esterification in the presence of a catalyst, and the obtained reaction product is subjected to polycondensation; a method in which the hard segment is prepared beforehand, and a soft segment component is added to this hard segment to prepare a randomized copolymer by transesterification; a method in which the hard segment and the soft segment are linked with a chain linking agent; and when poly(ε-caprolactone) is used for the soft segment, a method in which an addition reaction of a ε-caprolactone monomer with the hard segment is performed.

Epoxy Compound (B)

The epoxy compound (B) for use in the present invention is a di- or higher functional epoxy compound, more specifically, a compound having 2 or more epoxy groups, and preferably has excellent miscibility with the thermoplastic polyester elastomer (A). The epoxy compound (B) preferably has a weight average molecular weight (Mw) of 100 or more and an epoxy value of 1.0 meq/g or more; the epoxy compound (B) more preferably has a weight average molecular weight (Mw) of 200 to 5000 and an epoxy value of 5.0 to 20 meq/g.

When a commercially available product is used for the epoxy compound (B), the weight average molecular weight (Mw) measured by the manufacturer is applied. When the epoxy compound (B) is a single compound, the weight average molecular weight of the compound is considered to be the molecular weight of the epoxy compound (B).

When a commercially available product is used for the epoxy compound (B), the epoxy value measured by the manufacturer is applied. When the epoxy compound (B) is a single compound, the epoxy value can be calculated from the structure.

The di- or higher functional epoxy compound (B) specifically includes those having 2 epoxy groups, such as 1,6-dihydroxynaphthalene diglycidyl ether and 1,3-bis(oxiranylmethoxy)benzene; those having 3 epoxy groups, such as 1,3,5-tris(2,3-epoxypropyl)-1,3,5-triazine-2,4,6(1H,3H,5H)-trione (another name: tris(2,3-epoxypropyl)isocyanurate) and diglycerol triglycidyl ether; and those having 4 epoxy groups, such as a 1-chloro-2,3-epoxypropane/formaldehyde/2,7-naphthalenediol polycondensation product and pentaerythritol polyglycidyl ether. Of these, a polyfunctional epoxy compound having heat resistance in its skeleton is preferable. In particular, a difunctional or tetrafunctional epoxy compound having a naphthalene structure for the skeleton, or a trifunctional epoxy compound having a triazine structure for the skeleton is preferable. Difunctional or trifunctional epoxy compounds are preferable taking into consideration the degree of the increase in solution viscosity of the thermoplastic polyester elastomer (A), the effect in efficiently decreasing the acid value of the thermoplastic polyester elastomer (A), and the degree of gelatinization caused by the aggregation or solidification of the epoxy compound.

The di- or higher functional epoxy compound (B) for use may be a polymer having glycidyl groups. Examples include glycidyl group-containing styrene-based polymers.

Although the mechanism is not clearly known, the heat aging resistance of the resin composition to which grease is adhered can be further improved by the use of a di- or higher functional epoxy compound that has heat resistance in the skeleton, such as difunctional or tetrafunctional epoxy compounds having a naphthalene structure for the skeleton or trifunctional epoxy compounds having a triazine structure for the skeleton, as the di- or higher functional epoxy compound (B).

In the resin composition of the present invention, the ratio of the thermoplastic polyester elastomer (A) to the di- or higher functional epoxy compound (B) (content ratio; (A)/(B)) is 100/0.1 to 100/5 on a mass basis. The epoxy compound (B) in an amount of more than 5 parts by mass may lead to a reaction with the thermoplastic polyester elastomer to thereby cause gelatinization. The epoxy compound (B) in an amount of less than 0.1 parts by mass is not preferable because it may decrease its thickening effect. The mass ratio (A)/(B) is preferably 100/0.1 to 100/3, more preferably 100/0.2 to 100/2, and still more preferably 100/0.2 to 100/1.

Organic Carboxylic Acid Alkali Metal Salt Having 3 to 40 Carbon Atoms (C)

The organic carboxylic acid alkali metal salt having 3 to 40 carbon atoms (C) for use in the present invention refers to an alkali metal salt of $C_{3-40}$ aliphatic, alicyclic, or aromatic carboxylic acid. The alkali metal is preferably sodium, potassium, or lithium, and particularly preferably sodium.

The aliphatic carboxylic acid is a compound composed of a linear or branched aliphatic group to which one or more carboxyl groups are attached, and may have an unsaturated group, an alicyclic group, an aromatic group, or other substituents, such as a hydroxy group and a phosphoric ester group, in a part of the compound. The aliphatic carboxylic acid is preferably a compound composed of a linear saturated aliphatic group to which one or more carboxyl groups are attached.

Of aliphatic carboxylic acids, propionic acid, valeric acid, caproic acid, enanthic acid, caprylic acid, pelargonic acid, capric acid, lauric acid, myristic acid, palmitic acid, margaric acid, stearic acid, oleic acid, linoleic acid, montanic acid, and the like are preferable. Of alkali metal salts, sodium salts are preferable because of their solubility in a polyester elastomer, excellent crystal nucleation, and even the role of serving as a catalyst in the reaction between the thermoplastic polyester elastomer (A) and the epoxy compound (B) to thereby enhance the stability of melt viscosity.

The organic carboxylic acid of the organic carboxylic acid alkali metal salt having 3 to 40 carbon atoms (C) is preferably a $C_{3-20}$ aliphatic carboxylic acid because of its melting property and miscibility with the thermoplastic polyester elastomer (A).

Of these, aliphatic carboxylic acid metal salts having fewer than 14 carbon atoms are preferable because a small amount of such salts can increase the crystallization rate. $C_{5-13}$ aliphatic carboxylic acid metal salts are more preferable, and $C_{7-10}$ aliphatic carboxylic acid metal salts are still more preferable.

The alkali metal content in the resin composition must result in 50 to 2000 ppm on a mass basis by adding the organic carboxylic acid alkali metal salt having 3 to 40 carbon atoms (C). Less than 50 ppm may lead to a low improving effect on the cooling crystallization temperature (TC2), while more than 2000 ppm may decompose the thermoplastic polyester elastomer (A). The alkali metal content is preferably 100 to 1500 ppm, more preferably 200 to 1000 ppm, and particularly preferably 300 to 800 ppm.

The alkali metal content can be calculated from the amount of the organic carboxylic acid alkali metal salt (C) added, but can also be measured by performing ICP emission spectrometry on the polyester elastomer resin composition.

Inorganic Crystal Nucleating Agent (D)

The inorganic crystal nucleating agent (D) for use in the present invention is not particularly limited as long as the agent is unmelted when being subjected to melting processing, and can become crystal nuclei during a cooling process. Among inorganic crystal nucleating agents, talc and calcium carbonate are preferable, and talc is particularly preferable. The crystal nucleating agent (D) preferably has a particle size of 0.1 to 10 µm, and more preferably 0.5 to 6 µm. The inorganic crystal nucleating agent (D) with a particle size of more than 10 µm may act as foreign matter, thus decreasing flexing fatigue resistance. The amount of the crystal nucleating agent (D) (content) is 0 to 3.0 parts by mass, per 100 parts by mass of the thermoplastic polyester elastomer (A). The crystal nucleating agent (D) in an amount of more than 3.0 parts by mass is not preferable because it may decrease the flexing fatigue resistance.

In the present invention, although the inorganic crystal nucleating agent (D) is an optional component, adding the inorganic crystal nucleating agent (D) has an advantage in improving the appearance without impairing the melt viscosity. When the inorganic crystal nucleating agent (D) is added, the amount is preferably 0.2 to 1.5 parts by mass, per 100 parts by mass of the thermoplastic polyester elastomer (A).

Urea Compound Scavenger (E)

The urea compound scavenger (E) for use in the present invention is not limited, as long as the scavenger, due to being present in the polyester elastomer resin composition, can capture or dissolve the urea compound contained in grease to prevent the urea compound from intruding into the thermoplastic polyester elastomer (A), thus weakening the action of the urea compound on the skeleton molecule of the thermoplastic polyester elastomer (A), and reducing degradation of the thermoplastic polyester elastomer (A). To weaken the action of the urea compound on the thermoplastic polyester elastomer (A), the urea compound scavenger must have an amine value of 50 eq/t or more. The urea compound scavenger preferably has an amine value of 70 eq/t or more, and more preferably 100 eq/t or more.

The urea compound scavenger (E) for use in the present invention is preferably an amino group-containing compound, and may be an aliphatic or aromatic low-molecular-weight amino group-containing compound or an aliphatic or aromatic high-molecular-weight amino group-containing compound. The amino group-containing compound may also be a synthetic substance or a biological substance (a natural substance).

Examples of low-molecular-weight amino group-containing compounds for use in the present invention include 1,8-diaminonaphthalate, 3,4-diaminobenzoic acid, 2-aminobenzamide, biuret, malonamide, salicylamide, salicylanilide, o-phenylenediamine, o-mercaptobenzamide, N-acetylglycinamide, and 4-amino-3-hydroxybenzoic acid. Examples of high-molecular-weight amino group-containing compounds include amino-terminated polyamides, amino-terminated polyethers, amino-terminated polyesters, amino-terminated polyurethanes, amino-terminated polyureas, amino group-containing acrylic resins, amino group-modified olefin resins, and amino group-containing organopolysiloxanes.

The urea compound scavenger (E) for use is preferably a high-molecular-weight amino group-containing compound; in that case, the urea compound scavenger (E) preferably has an amine value of 50 to 2000 eq/t.

The amino group-containing compound for use in the present invention is preferably a polyamide having an amine value of 50 to 2000 eq/t.

The following describes the case where the urea compound scavenger contained in the resin composition of the present invention is a polyamide resin.

Polyamide Resin

A polyamide resin as used in the present invention refers to a high-molecular-weight compound having amide linkages in the molecular chain, and includes polyamides obtained from a diamine and a dicarboxylic acid, the diamine having $C_{2-20}$ aliphatic hydrocarbon groups or substituted $C_{2-20}$ aliphatic hydrocarbon groups, or $C_{6-16}$ aromatic hydrocarbon groups or substituted $C_{6-16}$ aromatic hydrocarbon groups, and the dicarboxylic acid having $C_{2-20}$ aliphatic hydrocarbon groups or substituted $C_{2-20}$ aliphatic hydrocarbon groups, or $C_{6-16}$ aromatic hydrocarbon groups or substituted $C_{6-16}$ aromatic hydrocarbon groups; polymers obtained from lactams; and polymers obtained from ω-amino carboxylic acid. Examples include polymers of a salt obtained by a reaction of an acid, such as adipic acid, sebacic acid, linoleic acid, and dodecanedioic acid, with ethylene diamine, hexamethylene diamine, meta-xylylene diamine, or the like. Any of these copolymers or a combination of two or more may be used. Specific examples include those obtained from a lactam or ω-amino carboxylic acid, such as polyamide 4, polyamide 6, polyamide 7, polyamide 8, polyamide 9, polyamide 11, and polyamide 12; those obtained from a diamine and a dicarboxylic acid, such as polyamide 66, polyamide 69, polyamide 610, polyamide 611, polyamide 612, polyamide 6T, polyamide 6I, and polyamide MXD6; and copolymers of those listed above, such as polyamide 6/66, polyamide 6/610, polyamide 6/6T, polyamide 6I/6T, polyamide 6/66/610, and polyamide 6/66/12.

The ratio of the thermoplastic polyester elastomer (A) to the urea compound scavenger (E) (content ratio) in the resin composition of the present invention ((A)/(E)) is 100/0.1 to 100/5 on a mass basis. More than 5 parts by mass of the urea compound scavenger (E) may impair the inherent properties of the thermoplastic polyester elastomer (A), and less than 0.1 parts by mass of the urea compound scavenger (E) may not exhibit its urea compound-scavenging effect. The urea compound scavenger (E) is preferably present in an amount of 0.1 to 4 parts by mass, and more preferably 1 to 3 parts by mass, per 100 parts by mass of the thermoplastic polyester elastomer (A).

The urea compound scavenger (E) must have an amine value of 50 eq/t or more. A urea compound scavenger (E) having an amine value of less than 50 eq/t may have less effect in weakening the action of the urea compound on the thermoplastic polyester elastomer (A). When the amine value is more than 2000 eq/t, the thermoplastic polyester elastomer (A) may hydrolyze, affecting the mechanical characteristics of the elastomer resin composition.

When the urea compound scavenger (E) is a polyamide, the urea compound scavenger (E) is preferably present in an amount of 5 parts by mass or less, more preferably 4 parts by mass or less, and particularly preferably 3 parts by mass or less, per 100 parts by mass of the thermoplastic polyester elastomer (A), and the urea compound scavenger (C) preferably has an amine value of 70 to 1000 eq/t, and more preferably 100 to 700 eq/t.

Polyester Elastomer Resin Composition

The polyester elastomer resin composition of the present invention is required to have a cooling crystallization temperature (TC2) lower than the melting point (Tm) of the resin composition by 20 to 40° C., and the difference between Tm and TC2 is preferably 25 to 35° C. For example, when the resin composition has a melting point (Tm) of 210° C., the cooling crystallization temperature (TC2) must be 170° C. or higher, preferably 175° C. or higher, and more preferably 180° C. or higher. A cooling crystallization temperature (TC2) of lower than 170° C. leads to an overly slow crystallization rate, which is likely to result in an uneven thickness of the resulting molded article, inner face defects in the blow molded article caused by melt fracture, or the like.

In the present invention, the cooling crystallization temperature (TC2) refers to an exothermic peak temperature in cooling crystallization as determined with a differential scanning calorimeter by melting a sample in nitrogen at 250° C. for 2 minutes and decreasing the temperature to 50° C. at a temperature decrease rate of 20° C./min.

The polyester elastomer resin composition of the present invention has the following feature: in a heat aging test for evaluating grease resistance described in Examples below, the tensile elongation is 200% or more after the polyester elastomer resin composition is subjected to a heat treatment at 140° C. for 300 hours. The tensile elongation refers to an elongation at break as measured in accordance with JIS K6251:2010, as described in the Examples.

The resin composition of the present invention preferably contains a widely used antioxidant, such as an aromatic amine-based antioxidant, a hindered phenol-based antioxidant, a phosphorus-based antioxidant, and a sulfur-based antioxidant.

Specific examples of the aromatic amine-based antioxidant for use in the resin composition of the present invention include phenyl naphthylamine, 4,4'-dimethoxy diphenylamine, 4,4'-bis(α,α-dimethylbenzyl) diphenylamine, and 4-isopropoxy diphenylamine.

For the hindered phenol-based antioxidant, a widely used compound can be used. Compounds having a molecular weight of 500 or more, such as N,N'-hexamethylene-bis(3,5-di-t-butyl-4-hydroxyhydrocinnamamide) and tetrakis[methylene-3(3,5-di-t-butyl-4-hydroxyphenyl)propionate] methane, are preferable because they are unlikely to volatilize in a high temperature atmosphere.

Examples of the phosphorus-based antioxidant include compounds containing phosphorus, such as phosphoric acid, phosphorous acid, hypophosphorous acid derivatives, phenylphosphonic acid, polyphosphonate, and diphosphite-based compounds. Specific examples include triphenyl phosphite, diphenyldecyl phosphite, phenyldiisodecyl phosphite, tri(nonylphenyl) phosphite, bis(2,4-di-t-butylphenyl) pentaerythritol diphosphite, and bis(2,6-di-t-butyl-4-methylphenyl)pentaerythritol diphosphite.

Examples of the sulfur-based antioxidant include compounds containing sulfur, such as thioether-based compounds, dithioic acid salt-based compounds, mercaptobenzimidazole-based compounds, thiocarbanilide-based compounds, and thiodipropionic ester-based compounds. Specific examples include dilauryl thiodipropionate, distearyl thiodipropionate, didodecyl thiodipropionate, ditetradecyl thiodipropionate, dioctadecyl thiodipropionate, pentaerythritol tetrakis(3-dodecyl thiopropionate), thiobis(N-phenyl-(-naphthylamine), 2-mercaptobenzothiazole, 2-mercaptobenzimidazole, tetramethylthiuram monosulfide, tetramethylthiuram disulfide, nickel dibutyl dithiocarbamate, nickel isopropyl xanthate, and trilauryl trithiophosphite. In particular, thioether-based antioxidants having a thioether structure are suitably used, because thioether-based antioxidants receive oxygen from an oxidized substance to reduce the substance.

Any of these antioxidants is preferably present in an amount of 0.01 to 3 parts by mass, more preferably 0.05 to 2 parts by mass, and still more preferably 0.1 to 1 parts by mass, per 100 parts by mass of the thermoplastic polyester elastomer (A).

A method for determining the formulation of the polyester elastomer resin composition and the component ratio for use in the present invention may be the following: the formulation and the component ratio are calculated from the proton integration ratio of $^1$H-NMR, which is measured by dissolving a sample in a solvent, such as deuterated chloroform.

Additionally, when the resin composition of the present invention is required to have weatherability, it is preferable to add an ultraviolet absorber and/or a hindered amine-based compound. For example, usable light stabilizers include benzophenone-based stabilizers, benzotriazole-based stabilizers, triazole-based stabilizers, nickel-based stabilizers, and salicyl-based stabilizers. The amount of a light stabilizer is preferably 0.1% or more and 5% or less of the polyester elastomer resin composition on a mass basis.

The polyester elastomer resin composition of the present invention may contain various other additives. Additives, such as resins other than those described above, inorganic fillers, stabilizers, and anti-aging agents, may be added in such an amount as to not impair the characteristics of the present invention. Other additives, such as mold-releasing agents, color pigments, inorganic or organic-based bulking agents, coupling agents, tackiness improvers, quenchers, stabilizers, such as metal deactivators, and flame retardants, may also be added.

The thermoplastic polyester elastomer (A), the di- or higher functional epoxy compound (B), the organic carboxylic acid alkali metal salt having 3 to 40 carbon atoms (C), the inorganic crystal nucleating agent (D), and the urea compound scavenger (E) are preferably present in a total amount of 80 mass % or more (however, component (D) may be 0%) in the polyester elastomer resin composition of the present invention. The total amount of components (A), (B), (C), (D), and (E) is more preferably 90 mass % or more, and still more preferably 95 mass % or more.

The method for producing the resin composition of the present invention includes melt-kneading the thermoplastic polyester elastomer (A), the di- or higher functional epoxy compound (B), the organic carboxylic acid alkali metal salt having 3 to 40 carbon atoms (C), the urea compound scavenger (E), and other optional components with a single or twin screw melt kneader, or a typical mixer for thermoplastic resin, such as a kneading heater, and subsequently subjecting the mixture to a granulation step to prepare pellets.

The polyester elastomer resin composition of the present invention has the following feature: the melt flow rate is 0.1 to 3.0 g/10 min at 230° C. under a load of 2.16 kg. Because of this feature, the polyester elastomer resin composition is suitable for blow molding.

EXAMPLES

The following describes Examples to explain the present invention in more detail. However, the present invention is not limited to the Examples in any manner. The measurement values described in the Examples were measured in accordance with the following methods.

Cooling Crystallization Temperature (TC2) and Melting Point (Tm):

A DSC220 differential scanning calorimeter produced by Seiko Instruments Inc. was used. 5 mg of a measurement sample was placed in an aluminum pan, and the pan was hermetically sealed with a pressed lid. The sample was melted at 250° C. for 2 minutes in nitrogen, and the temperature was decreased to 50° C. at a temperature decrease rate of 20° C./min. The exothermic peak temperature in cooling crystallization observed at this stage was determined as the cooling crystallization temperature (TC2). The temperature of the measurement sample was also increased from 50° C. to 250° C. at a rate of 20° C./min, and the endothermic peak due to melting observed in the obtained thermogram curve was determined to be the melting point (Tm).

Reduced Viscosity (Unit: dl/g):

0.02 g of a well dried polyester resin was dissolved in 10 mL of a mixture solvent of phenol/tetrachloroethane (mass ratio: 6/4), and measured at 30° C. with an Ubbelohde viscometer.

Acid Value (Unit: eq/t):

0.2 g of a sample was precisely weighed, dissolved in 20 mL of chloroform, and titrated with 0.01N potassium hydroxide (an ethanol solution) for determining the acid value. Phenolphthalein was used for the indicator.

Amine Value (Unit: eq/t):

3 g of a sample was weighed and dissolved in 80 mL of m-cresol. The solution was titrated with 0.05 mol/L of a solution of perchloric acid in methanol as a volumetric solution using AT-500N produced by Kyoto Electronics Manufacturing Co., Ltd., in accordance with the potentiometric titration technique to determine the amine value.

Starting materials used are as follows.

Thermoplastic Polyester Elastomer (A)

Polyester Elastomer A1

In accordance with the method disclosed in Reference Example 1 of JPH9-59491A (paragraph [0017]), a thermoplastic polyester elastomer containing 49 mass % of a hard segment (PBT) was produced from the following starting materials: terephthalic acid, 1,4-butanediol, and polyoxytetramethylene glycol (PTMG: the number average molecular weight 1500).

This polyester elastomer A1 had a melting point of 200° C., a reduced viscosity of 1.84 dl/g, and an acid value of 36 eq/t, with the PTMG content being 12 mol % of the entire glycol components.

Polyester Elastomer A2

In accordance with the method disclosed in Reference Example 1 of JPH9-59491A (paragraph [0017]), a thermoplastic polyester elastomer containing 48 mass % of a hard segment (PBT) was produced from the following starting materials: terephthalic acid, 1,4-butanediol, and polyoxytetramethylene glycol (PTMG: the number average molecular weight 2000).

This polyester elastomer A2 had a melting point of 210° C., a reduced viscosity of 2.17 dl/g, and an acid value of 33 eq/t with the PTMG content being 10 mol % of the entire glycol components.

Epoxy Group-Containing Compound (B)
B1: N-substituted triisocyanurate (tris(2,3-epoxypropyl) isocyanurate) TEPIC-S (produced by Nissan Chemical Industries, Ltd., molecular weight 297, epoxy value 10.1 meq/g)
B2: Glycidyl group-containing styrene/acrylic-based polymer ARUFON UG-4070 (produced by Toagosei Co., Ltd., Mw: 9700, epoxy value 1.4 meq/g)

Organic Carboxylic Acid Alkali Metal Salt (C)
C1: Sodium stearate (produced by NOF Corporation, melting point 230° C.)
C2: Sodium caprylate (produced by Nitto Chemical Industry Co., Ltd. CapNa, melting point 220° C.)

Inorganic Crystal Nucleating Agent (D)
D1: Talc (produced by Hayashi Kasei Co., Ltd., KCM7500, particle size 5.8 μm)

Urea Compound Scavenger (E)
E1: Polyamide 6/66/12 (molar ratio: 31/21/48), amine value 490 eq/t
E2: Polyamide MXD6, amine value 136 eq/t
E3: Polyamide 6, amine value 26 eq/t Other Additives
Mold-Releasing Agent
Licowax E (produced by Clariant) Phenol-based antioxidant
Irganox1010 (produced by BASF A.G.)

Examples 1 to 6 and Comparative Examples 1 to 7

The components, each at a ratio shown in Table 1 (mass ratio) per 100 parts by mass of the thermoplastic polyester elastomer, were melted and kneaded at 240° C., and formed into pellets with a twin screw extruder. The pellets of these polyester elastomer resin compositions were evaluated as described below. Table 1 shows the results.

Melt Flow Rate

In accordance with the test method (method A) described in JIS K7210-1:2014, the melt flow rate (MFR: g/10 min) was measured at a measurement temperature of 230° C. under load of 2160 g. For this measurement, compositions with a moisture content of 0.1 mass % or less were used.

Blow Moldability Evaluation

A direct blow-molded bottle was produced using a direct-blow molding machine (single screw extruder: L/D=25, full-flight screw, screw diameter 65 mm) with the cylinder of the machine set at a temperature of 180 to 230° C. A parison-forming die lip was attached to the tip of the cylinder, and blowing air was trapped in the mold, thereby forming a bottle. From the parison maintenance state and the product size at this time, blow moldability was evaluated.
A: drawdown is extremely small, and the shape is retained
B: drawdown is large, with the shape tending to collapse, but the parison is still manageable for blowing
C: drawdown is large, and the shape is collapsed, making it impossible to perform blowing Sink Mark Measurement A metallic insert was inserted into a flat-plate-forming mold with a size of 100 mm×100 mm×12 mm such that a thick portion (80 mm×20 mm×12 mm) is formed at a portion 80 to 100 mm from the gate end, and such that a thin portion (100 mm×80 mm×2 mm) is formed at a portion 0 to 80 mm from the gate end; thus, a molded article having a thick portion and a thin portion was famed. The following are the molding conditions: the cylinder temperature of the molding machine 240° C., injection time period 8 seconds, cooling time period 30 seconds, and mold temperature (as actually measured) 125° C. (Gate: a side gate with a size of 10 mm×10 mm×100 mm).

The maximum value T1 and the minimum value Ts of the thickness in the thickness direction of the thick portion of each obtained molded article were determined from the following equation, and the sink mark percentage (%) was determined.

$$(T1-Ts)/T1 \times 100$$

Grease Resistance Evaluation Test Method

An injection-molded article prepared at a cylinder temperature of 240° C. and a mold temperature of 50° C. (width: 100 mm, length: 100 mm, and thickness: 2.0 mm) was cut out in a dumbbell shape (JIS No. 3) in the direction perpendicular to the flow direction of the resin of the injection-molded article, thereby preparing a test specimen. With the test specimen coated with 3 g of grease containing a urea compound as a thickener (Raremax UBZ: produced by Kyodo Yushi Co., Ltd.) on one surface thereof, the specimen was annealed with a hot-air dryer at 140° C. for 300 hours. The specimen was measured for tensile elongation (elongation at break) in accordance with JIS K6251:2010, and the tensile elongation at break was determined.

TABLE 1

| | | Examples | | | | | | Comparative Examples | | | | | | |
|---|---|---|---|---|---|---|---|---|---|---|---|---|---|---|
| | | 1 | 2 | 3 | 4 | 5 | 6 | 1 | 2 | 3 | 4 | 5 | 6 | 7 |
| Formulation (Parts by Mass) | Polyester Elastomer A1 | | | | 100 | | | | | | | 100 | | 100 |
| | Polyester Elastomer A2 | 100 | 100 | 100 | | 100 | 100 | 100 | 100 | 100 | 100 | | 100 | |
| | B1 (TEPIC-S) | 0.3 | 0.3 | | | 0.35 | 0.4 | | 0.5 | 0.35 | 0.35 | 0.1 | 0.35 | 0.32 |
| | B2 (UG-4070) | | | 0.8 | 1.0 | | | | | | | | | |
| | C1 (Sodium Stearate) | | | | 1 | | | 1 | | | | 0.05 | 1 | |
| | C2 (Sodium Caprylate) | 0.3 | 0.4 | | 0.3 | 0.5 | | | | 2 | 0.5 | | | |
| | D1 (Talc) | 0.3 | 0.3 | 0.3 | 0.3 | 0.3 | | | 0.3 | | 0.3 | | | |
| | E1 (PA 6/66/12) | 2 | 2 | | 0.5 | | | | | | 6 | | | |
| | E2 (PA MXD6) | | | 1 | | 3 | 3 | | | | | | | |
| | E3 (PA 6) | | | | | | | | | | | | 3 | |
| | Licowax E | 0.2 | 0.2 | 0.2 | 0.2 | 0.2 | 0.2 | 0.2 | 0.2 | 0.2 | 0.2 | 0.2 | 0.2 | |

TABLE 1-continued

| | | Examples | | | | | | Comparative Examples | | | | | | |
|---|---|---|---|---|---|---|---|---|---|---|---|---|---|---|
| | | 1 | 2 | 3 | 4 | 5 | 6 | 1 | 2 | 3 | 4 | 5 | 6 | 7 |
| Properties | Irganox1010 | 0.2 | 0.2 | 0.2 | 0.2 | 0.2 | 0.2 | 0.2 | 0.2 | 0.2 | 0.2 | 0.2 | 0.2 | |
| | Melt Flow Rate (g/10 min) | 1.5 | 2.0 | 1.0 | 0.5 | 1.5 | 2.5 | 15 | 0.8 | 15 | 16 | 3.6 | 1.0 | 1.5 |
| | Blow Moldability | A | A | A | A | A | A | C | A | C | C | C | A | A |
| | Alkali Metal Content (Ppm) | 402 | 531 | 728 | 406 | 663 | 714 | — | — | 2690 | 642 | 37 | 712 | — |
| | TC2 (° C.) | 175 | 180 | 186 | 177 | 186 | 183 | 163 | 168 | 187 | 186 | 169 | 183 | 155 |
| | TM (° C.) | 210 | 210 | 209 | 197 | 210 | 211 | 212 | 208 | 212 | 211 | 199 | 207 | 198 |
| | Sink Mark Percentage in Molded Article (%) | 6.9 | 6.0 | 5.2 | 6.8 | 5.2 | 5.8 | 9.5 | 9.2 | 5.0 | 5.1 | 8.8 | 5.6 | 12.1 |
| | Tensile Elongation at Break (%) (Grease Resistance Evaluation) | 320 | 290 | 200 | 220 | 320 | 280 | 40 | 80 | 40 | 100 | 100 | 120 | 100 |

The polyester elastomer resin compositions of Examples 1 to 6 satisfied the melt flow rate defined in the present invention, and provided excellent blow molded articles. Additionally, the compositions also satisfied the difference between Tm and TC2 defined in the present invention, and the sink mark percentage tended to be smaller as the amount of sink marks in the thick portion of each molded article was decreased. When the test specimens were coated with grease on one surface thereof at 140° C. and allowed to stand for 300 hours, the specimens had a tensile elongation at break of 200% or more, exhibiting excellent grease resistance.

Comparatively, Comparative Examples 1 to 7 did not provide the effect of the present invention due to a lack of at least one component of the combination of components (A), (B), (C), (D), and (E), or an insufficient or excessive amount of these components.

INDUSTRIAL APPLICABILITY

Because the polyester elastomer resin composition of the present invention can slow the decline in the crystallization rate despite its high melt viscosity, the composition exhibits excellent molding processability during blow molding, and is useful in obtaining blow molded articles having both a thin portion and a thick portion.

The invention claimed is:

1. A polyester elastomer resin composition for blow molding comprising:
   a thermoplastic polyester elastomer (A);
   a di- or higher functional epoxy compound (B);
   an organic carboxylic acid alkali metal salt having 3 to 40 carbon atoms (C);
   an inorganic crystal nucleating agent (D); and
   a urea compound scavenger having an amine value of 50 eq/t or more (E), wherein
   the thermoplastic polyester elastomer (A) is composed of a hard segment and a soft segment that are linked to each other,
      the hard segment being composed of a polyester formed from an aromatic dicarboxylic acid and an aliphatic and/or alicyclic glycol,
      the soft segment being at least one member selected from aliphatic polyethers, aliphatic polyesters, or aliphatic polycarbonates,
   per 100 parts by mass of component (A), component (B) is present in an amount of 0.1 to 5 parts by mass, component (D) is present in an amount of 0 to 3 parts by mass, and component (E) is present in an amount of 0.1 to 5 parts by mass,
   component (C), on an alkali metal basis, is present in an amount of 50 to 2000 ppm in the polyester elastomer resin composition on a mass basis,
   the polyester elastomer resin composition has a cooling crystallization temperature (TC2) lower than the melting point (Tm) of the polyester elastomer resin composition by 20 to 40° C., and
   the polyester elastomer resin composition has a melt flow rate of 0.5 to 3.0 g/10 min under a load of 2.16 kg (as measured in accordance with JIS K7210-1:2014 A at a temperature of 230° C.).

2. The polyester elastomer resin composition for blow molding according to claim 1, wherein the urea compound scavenger (E) is an amino group-containing compound having an amine value of 50 to 2000 eq/t.

3. The polyester elastomer resin composition for blow molding according to claim 1, wherein
   the thermoplastic polyester elastomer (A) is a copolymer formed from terephthalic acid, 1,4-butanediol, and polyoxytetramethylene glycol,
   the polyoxytetramethylene glycol has a number average molecular weight of 500 to 4000,
   the amount of the polyoxytetramethylene glycol copolymerized is 5 to 20 mol % of the entire glycol component that partly forms the thermoplastic polyester elastomer (A).

4. The polyester elastomer resin composition for blow molding according to claim 1, wherein the epoxy compound (B) has a weight average molecular weight (Mw) of 100 or more, and an epoxy value of 1.0 meq/g or more.

5. The polyester elastomer resin composition for blow molding according to claim 1, wherein the organic carboxylic acid of the organic carboxylic acid alkali metal salt having 3 to 40 carbon atoms (C) is an aliphatic carboxylic acid having 3 to 20 carbon atoms.

6. The polyester elastomer resin composition for blow molding according to claim 1, wherein the inorganic crystal nucleating agent (D) is talc.

7. The polyester elastomer resin composition for blow molding according to claim 1, wherein after the polyester elastomer resin composition is subjected to heat treatment at 140° C. for 300 hours with a urea compound-containing grease being applied to the composition, the polyester elastomer resin composition has a tensile elongation of 200% or more.

* * * * *